United States Patent [19]
Barthorpe et al.

[11] Patent Number: 5,263,541
[45] Date of Patent: Nov. 23, 1993

[54] INHIBITION OF SCALE GROWTH UTILIZING A DUAL POLYMER COMPOSITION

[76] Inventors: Richard T. Barthorpe, 8889 W. Fremont Ave., Littleton, Colo. 80123; Frank L. Dormish, 7906 E. Lehigh Ave., Denver, Colo. 80237

[21] Appl. No.: 934,081

[22] Filed: Aug. 20, 1992

Related U.S. Application Data

[60] Continuation-in-part of Ser. No. 801,311, Dec. 2, 1991, which is a division of Ser. No. 646,503, Jan. 22, 1991, Pat. No. 5,092,404, which is a continuation of Ser. No. 431,262, Nov. 1, 1989, abandoned.

[51] Int. Cl.$^5$ .......................... C02F 5/10; E21B 43/12
[52] U.S. Cl. ...................... 166/279; 166/310; 210/698; 210/701; 210/747; 252/8.552
[58] Field of Search .............. 166/279, 310, 371; 210/698, 701, 747; 252/180, 181, 8.552

[56] References Cited

U.S. PATENT DOCUMENTS

| | | | |
|---|---|---|---|
| 3,654,993 | 4/1972 | Smith et al. | 166/279 |
| 4,457,847 | 7/1984 | Lorenc et al. | 210/698 |
| 4,634,532 | 1/1987 | Logan et al. | 210/697 |
| 4,640,793 | 2/1987 | Persinski et al. | 252/82 |
| 4,710,303 | 12/1987 | Emmons | 210/698 |
| 4,894,346 | 1/1990 | Myers et al. | 436/85 |
| 4,923,617 | 5/1990 | Heilweil et al. | 210/698 |
| 5,039,441 | 7/1991 | Thomas et al. | 252/142 |
| 5,060,728 | 10/1991 | Yan | 166/310 X |
| 5,092,404 | 3/1992 | Falk et al. | 166/250 |
| 5,152,403 | 10/1992 | Patel | 210/701 X |
| 5,167,828 | 12/1992 | Emmons et al. | 166/310 X |

*Primary Examiner*—George A. Suchfield

[57] ABSTRACT

A method for inhibiting inorganic sulfate scale growth in an aqueous fluid present within or produced from a subterranean formation is performed by contacting the aqueous fluid in situ with a scale inhibitor composition containing two homopolymers in solution within an aqueous liquid medium. The first homopolymer is a polyvinyl sulfonate and the second homopolymer is a polyacrylic acid. The weight ratio of the first homopolymer to second homopolymer is preferably at least about 1:1 and the aqueous fluid being contacted by the composition typically contains a relatively high concentration of precursor ions of inorganic sulfate scale, including scale-forming inorganic cations and scale-forming sulfate anions.

16 Claims, 1 Drawing Sheet

INHIBITION OF SCALE GROWTH UTILIZING A DUAL POLYMER COMPOSITION

This is a continuation-in-part application of copending application Ser. No. 07/801,311 filed on Dec. 2, 1991, which is a divisional application of application Ser. No. 07/646,503 filed on Jan. 22, 1991, now issued as U.S. Pat. No. 5,092,404, which was a file wrapper continuation application of application Ser. No. 07/431,262 filed on Nov. 1, 1989, and now abandoned.

TECHNICAL FIELD

The present invention relates to scale inhibitors and more particularly to a method for inhibiting scale growth in an aqueous fluid present within or produced from a subterranean formation utilizing a scale inhibitor composition containing two homopolymers.

BACKGROUND OF THE INVENTION

The precipitation of inorganic salts, such as calcium carbonate, calcium sulfate, barium sulfate, or strontium sulfate, from aqueous fluids to form scale is a persistent and common problem encountered in many field operations for the recovery of hydrocarbons from subterranean formations. In particular, scale growth in aqueous formation fluids and subsequent undesirable deposition of the scale in the formation as well as production equipment and tubing is typically caused by incompatible fluids which are commingled in situ during field operations, especially enhanced oil recovery (EOR) operations involving waterflooding or a water drive.

By definition, aqueous fluids are deemed incompatible if each fluid contains distinct ions which form a precipitate that deposits as a scale when the fluids are commingled. A common example of two incompatible fluids is a connate water or brine containing barium, calcium, or strontium cations and an EOR injection water containing sulfate anions. Offshore operations often involve the injection of large volumes of sea water containing relatively high concentrations of sulfate anions into subterranean formations containing brine with relatively high concentrations of the above-listed cations. Upon mixing of the sea water and formation brine in situ, precipitation of barium, calcium or strontium sulfate scale occurs in the formation as well as in the subsurface and surface production tubing and equipment. Scale growth is most detrimental in the near production well bore environment of the formation, i.e., within about 2 or 3 meters of the production well bore.

The presence of carbon dioxide in the formation can also exacerbate scaling problems. Carbon dioxide is frequently introduced into the formation during EOR processes resulting in absorption of carbon dioxide into the connate water. Some formation brines, such as those found in the North Sea, may also naturally contain relatively high concentrations of carbon dioxide. When pressure is reduced in a formation containing fluids with a relatively high carbon dioxide concentration, such as during hydrocarbon production, the carbon dioxide flashes to the gas phase, thereby increasing the pH of the aqueous fluids and causing the growth of calcium carbonate scale in the near production well bore environment and in the production tubing and equipment.

Conventional methods for removing scale deposited in a subterranean formation or production equipment and tubing are both costly and ineffective. Chemical removal methods are known wherein a chemical agent is repeatedly injected into the affected formation, equipment, or tubing to attack the scale. Such methods are, however, relatively expensive and, thus, impractical. Scale is also removable using various mechanical devices, such as impact or cavitation jets. The mechanical devices are usually employed downhole after first killing the well. Mechanical scale removal methods are, however, likewise relatively impractical, being time-consuming, inefficient, and potentially hazardous, particularly where a radioactive precipitate, such as radium sulfate, is present in the scale being removed.

Preventative methods for inhibiting the growth and deposition of scale have been advanced as a more preferred approach to the problem of scale deposition. Conventional commercial scale inhibitors primarily comprise polyelectrolytes, such as polycarboxylates or polyphosphonates. However, the effectiveness of such polyelectrolyte scale inhibitors depends to a large part on the degree of ionization of the inhibitor at the pH value of the connate water. At relatively low pH values, e.g., about 6 or less, the effectiveness of conventional polyelectrolyte scale inhibitors for inhibiting the growth of barium, calcium, or strontium sulfate scale significantly decreases. In addition, conventional polyelectrolyte scale inhibitors dissolve calcium carbonate scale, thereby undesireably increasing the calcium ion concentration in the formation fluids and causing precipitation of the inhibitors themselves.

In view of the problems set forth above, it is apparent that a need exists for a scale inhibitor having utility in a subterranean formation, which effectively inhibits the growth of scale therein. A need is particularly acute for a scale inhibitor which effectively inhibits the growth of inorganic sulfate scale, such as barium sulfate, in relatively low pH environments of about 6 or less.

Accordingly, it is an object of the present invention to provide a scale inhibitor which will effectively inhibit the growth of scale, particularly inorganic sulfates such as barium sulfate, in an aqueous fluid present in or produced from a subterranean formation. It is another object of the present invention to provide a scale inhibitor which does not promote the dissolution of carbonate scale to the same extent as conventional polyelectrolyte scale inhibitors when placed in a subterranean formation. It is a further object of the present invention to provide a process for inhibiting scale growth, particularly inorganic sulfate scale such as barium sulfate, in aqueous fluids having a pH of about 6 or less which are present in or produced from a subterranean formation.

SUMMARY OF THE INVENTION

The present invention provides a method for inhibiting scale growth, particularly inorganic sulfate scale growth, in an aqueous fluid present within or produced from a subterranean formation by contacting the aqueous fluid with a scale inhibitor composition comprising a mixture of two homopolymers. The first homopolymer is a polyvinyl sulfonate and the second homopolymer is a polyacrylic acid. The weight ratio of the first homopolymer to the second homopolymer in the composition is preferably at least about 1:1. The scale inhibitor composition further comprises an aqueous medium providing an aqueous solution of the homopolymer mixture.

The aqueous fluid being contacted by the scale inhibitor composition typically contains a relatively high concentration of precursor ions of inorganic sulfate scale, including scale-forming inorganic cations and scale-forming sulfate anions, and is acidic, generally having a pH equal to about 6 or less. The aqueous fluid is contacted with the scale inhibitor composition in situ, for example, by squeeze treating a hydrocarbon production well bore in fluid communication with the formation. A sufficient amount of scale inhibitor composition contacts the aqueous fluid to produce a total concentration of active homopolymers in a typical aqueous fluid on the order of at least about 40 ppm.

The present invention will be further understood from the accompanying drawings, taken in conjunction with the accompanying description.

DESCRIPTION OF PREFERRED EMBODIMENTS

Figure 1:
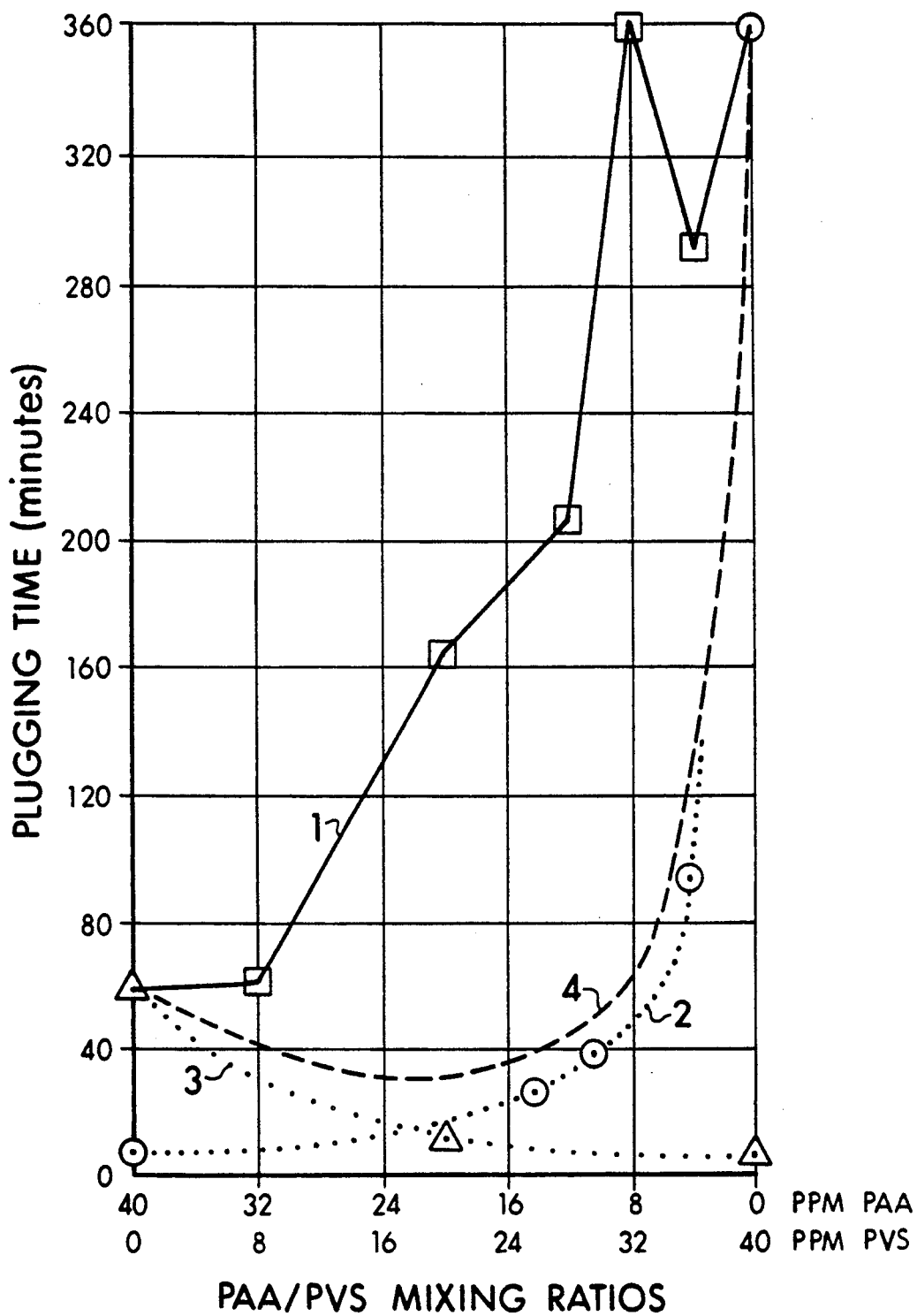
FIG. 1 is a graph illustrating the scale inhibiting performance of a dual polymer composition as used in the manner of the present invention in comparison to the individual scale inhibiting performance of each polymer of the composition.

The present invention relates to a method utilizing a dual polymer composition to inhibit the growth of inorganic sulfate scale in an aqueous fluid. The method is specifically designed to effectively prevent the deposition of inorganic sulfate scale in subterranean hydrocarbon-bearing formations or in surface or subsurface tubing or equipment in fluid communication with the formation, wherein such tubing and equipment is used for the production of hydrocarbon fluids from the formation.

The dual polymer composition comprises two homopolymers, the first homopolymer being distinct from the second homopolymer. The first homopolymer is a polyvinyl sulfonate having a molecular weight of at least about 3,000, preferably from about 3,000 to about 30,000, more preferably from about 7,000 to about 30,000, and most preferably from about 10,500 to about 30,000.

The term "molecular weight", as used herein with reference to the polyvinyl sulfonate, is defined as the weight average molecular weight of a molecule and is determined by an experimental method in which each molecule or chain of a molecule makes a contribution to the measured weight. The weight average molecular weights recited herein are determined by means of a size exclusion chromatographic technique employing a polymeric gel packed column. In contrast, the number average molecular weight is calculated by dividing the sum of the molecular weight values for each molecule by the number of molecules.

In addition to molecular weight, polyvinyl sulfonate is also characterizable in terms of its polydispersity. Polydispersity is defined as the experimentally-determined weight average molecular weight divided by the number average molecular weight. Polyvinyl sulfonates having utility in the method of the present invention preferably have a polydispersity less than about 2.0 and are thermally stable. Such polyvinyl sulfonates are prepared by polymerizing commercially available vinyl sulfonic acid according to methods known to one skilled in the art, such as the polymerization process disclosed in U.S. Pat. No. 5,092,404, which is incorporated herein by reference.

The second homopolymer is a polyacrylic acid. The molecular weight ranges for the polyacrylic acid are generally somewhat lower than those recited above for the polyvinyl sulfonate. Accordingly, the molecular weight of the polyacrylic acid is at least about 1,000, preferably from about 1,000 to about 30,000, and most preferably from about 2,000 to about 5,000. Like the polyvinyl sulfonate however, the polyacrylic acid is thermally stable.

Preferred polyacrylic acids include a polyacrylic acid manufactured by B. F. Goodrich Co. and commercially available under the trade name "K-732", and a polyacrylic acid commercially available, from T. R. Oil Services Ltd. under the trade name "SCALETREAT" 205. "K-732" and "SCALETREAT 205" have molecular weights of 5100 and 3500, respectively. Such polyacrylic acids are manufactured according to methods well known to those skilled in the art by polymerization of acrylic acid monomer.

The weight ratio of the first homopolymer to the second homopolymer in the dual polymer composition is generally between about 10:1 and about 1:10, preferably between about 10:1 and about 1:4, more preferably between about 10:1 and about 1:1, and most preferably between about 9:1 and about 3:2. The exact ratio selected for any particular treatment is a function of both performance and economics. One specific factor taken into account when selecting the polymer ratio of the dual polymer composition is the absorption/desorption rates of each polymer with respect to the particular geology of the formation matrix. As will be apparent, the ratio can be adjusted proportional to the absorption/desorption rates of each polymer such that a desired corresponding polymer ratio is achieved in the aqueous fluid of the formation after the aqueous fluid contacts the dual polymer composition.

The dual polymer composition is preferably in the form of an aqueous solution The term "solution", as employed herein with reference to the dual polymer composition, broadly encompasses dispersions, suspensions, and emulsions of the homopolymers in a liquid medium, as well as true solutions of the homopolymers in the liquid medium. Accordingly, in addition to the two homopolymers, the dual polymer composition of the present invention further comprises an aqueous liquid medium having the first and second homopolymers in solution therein.

The first homopolymer, second homopolymer and aqueous medium may be combined in any order to form the aqueous homopolymer solution, and may be combined according to any manner known in the art such that neither homopolymer is substantially degraded in the process. A preferred aqueous medium is one which is inert with the homopolymers, the formation fluid, and the formation matrix. A brine having a relatively low concentration of sulfate ions or, alternatively, a fresh water, if the formation matrix is not susceptible to clay damage, typically satisfies these criteria.

The total concentration of active homopolymers in the aqueous solution is at a level sufficient to effectively inhibit growth of scale in the aqueous fluid contacted thereby. The effective total concentration of active homopolymers in the aqueous solution is selected as a function of the specific aqueous fluid to be contacted by the dual polymer containing solution. In particular, the total active homopolymer concentration in the aqueous solution is selected as a function of the molar ratio of scale-forming ions in the aqueous fluid contacted therewith, and further as a function of the supersaturation level of the scale-forming ions in the aqueous fluid. An effective total active homopolymer concentration for a typical aqueous fluid is at least about 10 ppm, preferably at least about 30 ppm, more preferably between about 40 and 100 ppm, and most preferably between about 40 and 50 ppm. However, as will be understood by the skilled artisan, these ranges can vary for different aqueous fluids.

The aqueous fluid is a brine containing a relatively high concentration of scale-forming inorganic cations, such as barium, calcium or strontium cations, and a relatively high concentration of scale-forming sulfate anions. The concentration of any one scale-forming cation in the aqueous fluid is typically at least about 50 ppm, and with specific reference to the barium cation, is more typically at least about 500 ppm, and most typically at least about 1000 ppm, with like concentrations of sulfate anions also in the aqueous fluid. The aqueous fluid is commonly a brine residing in a formation following the commingling of sea water having a high sulfate content with a formation brine having a high barium, calcium, and strontium content during hydrocarbon displacement flooding of the formation with sea water to enhance hydrocarbon recovery therefrom.

The aqueous dual polymer solution can be contacted with the aqueous fluid present in the subterranean formation, or present in surface or subsurface tubing in fluid communication therewith, according to any suitable manner known to those skilled in the art, such as by metering into a well bore via a small diameter tube (e.g., between about 1 to 2.5 cm inside diameter), by injection through a gas lift valve, or by placement of the encapsulated solution in a well bore. It is preferred, however, to squeeze the dual polymer solution into a subterranean formation and thereby contact the aqueous fluid in situ.

In accordance with a squeeze technique as utilized in the method of the present invention, an aqueous dual polymer solution is prepared by dilution having a total active polymer concentration between about 0.5% and about 10% by volume and preferably between about 1% and about 5% by volume. The solution is injected into the subterranean formation via a production well bore in fluid communication with the formation and followed by an overflush, for example, a brine compatible with the formation fluid, i.e., having a relatively low concentration of scale-forming sulfate ions. The well bore is shut in for a suitable period, such as up to about 24 hours or more.

The shut-in period permits the two homopolymers to absorb into the formation matrix. The well bore is then returned to production following the shut-in period. During hydrocarbon recovery operations following the shut-in period, the two homopolymers are desorbed over a period of time into the aqueous fluid present in the formation to produce a total active polymer concentration and polymer ratio in the aqueous fluid within the ranges set forth above.

As recited above, the total concentration of active polymer in the aqueous solution is selected as a function of the method of fluid contacting. Thus, where fluid contacting is achieved by metering, the total active polymer concentration in the aqueous solution is adjusted above the ranges set forth for squeeze treatments. The preferred total active polymer concentration range for the aqueous solution when fluid contacting is achieved by metering is between about 20% and about 30% by volume. Where fluid contacting is achieved by means of encapsulated dosages of the dual polymer composition, the total active polymer concentration of the solution can be on the order of about 50% or more.

In any case, the particular mixture of homopolymers taught herein effectively inhibits the growth of inorganic sulfate scale in the aqueous fluid and prevents the subsequent deposition of such scale in the formation, or tubing or equipment in fluid communication therewith, when the homopolymers are introduced into the aqueous fluid in situ, thus avoiding undesirable plugging of the formation, tubing, or equipment. It is further desirable to monitor the homopolymer concentration in the aqueous fluid produced from the formation to ensure that a sufficient concentration of the homopolymers is present therein to adequately inhibit inorganic sulfate scale growth and to predict the need for subsequent treatments of the production well bore.

It is noted that the method of the present invention has particular utility for the specific inhibition of barium sulfate scale growth in an aqueous fluid resulting from the commingling of incompatible fluids during an EOR operation. The present method also has specific utility to the inhibition of scale growth in an aqueous fluid having a relatively high concentration of carbon dioxide. The method is, however, generally applicable to a broad range of formation temperatures and mineralogies.

The following examples demonstrate the practice and utility of the present invention, but are not to be construed as limiting the scope thereof.

EXAMPLE 1

A brine is prepared having a relatively high concentration of inorganic scale-forming cations and anions. The brine is designed to simulate a mixture of formation water and sea water in a weight ratio of 80:20. The ionic composition of the brine is as follows:

|     | ppm |
| --- | --- |
| Ba  | 612 |
| Mg  | 314 |
| Ca  | 336 |
| Sr  | 26  |
| SO$_4$ | 530 |

The brine has total dissolved solids (tds) of 64,430 ppm and additionally has $CO_2$ dissolved therein.

A plurality of samples at various total active polymer concentration levels are prepared by adding variable quantities of a dual polymer scale inhibitor composition to the brine. The composition comprises a mixture of two homopolymers, wherein the first homopolymer is polyvinyl sulfonate (PVS) and the second homopolymer is polyacrylic acid (PAA). The polyvinyl sulfonate has a molecular weight of about 8100 and the polyacrylic acid is "SCALETREAT 205" having a molecular weight of about 3500.

A test apparatus is constructed comprising a capillary tube and pressure sensors. Each sample is continuously conveyed through the capillary tube at a temperature of about 120° C. until the pressure drop ($\Delta P$) across the capillary tube reaches 690 kPa or until 360 minutes elapses, whichever occurs first. If a $\Delta P$ value of 690 kPa is reached, the elapsed time to attain this value is recorded. An intermediate time is also recorded indicating the elapsed time required to attain an intermediate $\Delta P$ value of 345 kPa. If, however, a $\Delta P$ value of 690 kPa is not reached within 360 minutes from the outset of the run, the $\Delta P$ value at 360 minutes is recorded and the run is terminated. In addition to measuring $\Delta P$ as a function of time, the concentration of barium ions in the effluent is measured as a function of time and recorded at times corresponding to the recording of ΔP.

The results of the experimental runs are set forth below in Table 1, wherein the time in which the threshold pressure drop is achieved is indicative of the rate of scale deposition in the capillary tube and is likewise indicative of the effectiveness of the scale inhibitor.

TABLE 1

| Run | Active Conc. (ppm) | | | Time to ΔP (min) | | Effluent Ba | |
|---|---|---|---|---|---|---|---|
| | Total | PAA | PVS | 345 kPa | 690 kPa | ppm | % total Ba |
| 1 | 24 | 5 | 19 | 24.8 | 27.8 | — | — |
| 2 | 30 | 3 | 27 | 42.7 | 45.1 | 292 | 49.1 |
| 3 | 30 | 6 | 24 | 58.8 | 63.4 | 333 | 56.0 |
| 4 | 32 | 10 | 22 | 54.8 | 57.3 | 330 | 55.5 |
| 5 | 36 | 7 | 29 | 168.0 | 191.3 | 317 | 53.4 |
| 6 | 40 | 4 | 36 | 288.5 | 290.8 | 209 | 35.2 |
| 7 | 40 | 8 | 32 | no ΔP at 360 | | 313 | 52.7 |
| 8 | 40 | 12 | 28 | 200.1 | 207.2 | 321 | 54.0 |
| 9 | 40 | 20 | 20 | 159.8 | 165.5 | 306 | 51.5 |
| 10 | 40 | 32 | 8 | 60.8 | 62.3 | 273 | 45.9 |
| 11 | 60 | 12 | 50 | 28 kPaΔP at 360 | | 348 | 58.6 |
| 12 | 60 | 18 | 42 | no ΔP at 360 | | 328 | 55.2 |
| 13 | 100 | 20 | 80 | 14 kPaΔP at 360 | | 404 | 68.0 |
| 14 | 100 | 30 | 70 | no ΔP at 360 | | 337 | 56.7 |

It is apparent from Table 1 that effective scale inhibition is achieved with a total active polymer concentration in the aqueous fluid as low as 40 ppm, wherein the ratio of PVS:PAA ranges from 1:1 to 9:1.

EXAMPLE 2

A plurality of samples are prepared in substantially the same manner as Example 1 except that the polyacrylic acid is "K-732" having a molecular weight of 5100. The results of the experimental runs using these samples are set forth below in Runs 1-4 of Table 2. Runs 5 and 6 are comparative runs wherein the scale inhibitor contains only a single homopolymer.

TABLE 2

| Run | Active Conc. (ppm) | | | Time to ΔP (min) | | Effluent Ba | |
|---|---|---|---|---|---|---|---|
| | Total | PAA | PVS | 345 kPa | 690 kPa | ppm | % total Ba |
| 1 | 32 | 6 | 26 | 27.9 | 30.7 | 356 | 59.9 |
| 2 | 40 | 8 | 32 | 216.5 | 241.9 | 353 | 59.4 |
| 3 | 60 | 12 | 48 | 7 kPa ΔP at 360 | | 354 | 59.6 |
| 4 | 100 | 30 | 70 | 28 kPa ΔP at 360 | | 424 | 71.4 |
| 5 | 40 | 40 | 0 | 13.9 | 15.0 | — | — |
| 6 | 80 | 80 | 0 | 126.0 | 127.0 | 109 | 18.3 |

Run 2 of Table 2 shows that effective scale inhibition can be achieved with a different PAA having a higher molecular weight than that of Example 1. The total active polymer concentration in the aqueous fluid is retained at 40 ppm and the ratio of PVS:PAA is 8:2. Runs 5 and 6 show the inferior performance of a single polymer scale inhibitor relative to the dual polymer scale inhibitor of the present invention.

EXAMPLE 3

A plurality of samples are prepared in substantially the same manner as Example 1 except that the polyvinyl sulfonate has a molecular weight of about 5000. The results of the experimental runs using these samples are set forth below in Table 3.

TABLE 3

| Run | Active Conc. (ppm) | | | Time to ΔP (min) | | Effluent Ba | |
|---|---|---|---|---|---|---|---|
| | Total | PAA | PVS | 345 kPa | 690 kPa | ppm | % total Ba |
| 1 | 40 | 8 | 32 | 99.9 | 103.7 | 317 | 53.4 |
| 2 | 60 | 12 | 48 | no ΔP at 360 | | 298 | 50.2 |
| 3 | 100 | 20 | 80 | no ΔP at 360 | | 320 | 52.9 |
| 4 | 160 | 32 | 128 | no ΔP at 360 | | 391 | 65.8 |

Comparison of Run 1 of Table 3 with Run 7 of Table 1 suggests that the higher molecular weight polyvinyl sulfonate of Example 1 is more effective in the method of the present invention.

EXAMPLE 4

A plurality of samples are prepared in substantially the same manner as Example 1. The results of the experimental runs using these samples are set forth below in Runs 1-5 of Table 4. Runs 7-12 are comparative runs wherein the scale inhibitor contains only a single homopolymer. Run 6 is a control run wherein no scale inhibitor, only brine, is used. Plugging time is recorded when the pressure drop in the capillary tube reaches 345 kPa.

TABLE 4

| Run | Active Conc. (ppm) | | | Plugging Time (min) |
|---|---|---|---|---|
| | Total | PAA | PVS | |
| 1 | 40 | 4 | 36 | 290 |
| 2 | 40 | 8 | 32 | no ΔP at 360 |
| 3 | 40 | 12 | 28 | 208 |
| 4 | 40 | 20 | 20 | 164 |
| 5 | 40 | 32 | 8 | 60 |
| 6 | 0 | 0 | 0 | 8 |
| 7 | 20 | 20 | 0 | 12 |
| 8 | 40 | 40 | 0 | 60 |
| 9 | 25 | 0 | 25 | 26 |
| 10 | 30 | 0 | 30 | 40 |
| 11 | 35 | 0 | 35 | 94 |
| 12 | 40 | 0 | 40 | no ΔP at 360 |

The data of Table 4 is reproduced graphically in FIG. 1. Curve 1 shows the performance of the dual polymer scale inhibitor of the present invention. Curve 2 shows the performance of polyvinyl sulfonate alone as a scale inhibitor and Curve 3 shows the performance of polyacrylic acid alone as a scale inhibitor. Curve 4 is the sum of Curves 2 and 3. The region lying between Curves 1 and 4 represents the synergistic performance improvement realized by using the dual polymer scale inhibitor of the present invention in comparison to the additive performance of the two polymers individually.

While the forgoing preferred embodiments of the invention have been described and shown, it is understood that alternatives and modifications, such as those suggested and others, may be made thereto and fall within the scope of the invention.

We claim:

1. A method for inhibiting inorganic sulfate scale growth in an aqueous fluid present in or produced from a subterranean formation comprising:

contacting said aqueous fluid with a scale inhibitor composition comprising a first homopolymer and a second homopolymer, wherein said first homopolymer is a polyvinyl sulfonate and said second homopolymer is a polyacrylic acid, and further wherein sufficient amounts of said first and second homopolymers contact said aqueous fluid to substantially inhibit growth of said inorganic sulfate scale in said aqueous fluid.

2. The method of claim 1 wherein said scale inhibitor composition further comprises an aqueous medium having said first and second homopolymers in solution therein.

3. The method of claim 2 wherein said aqueous fluid is contacted with said first and second homopolymers of said scale inhibitor composition by injecting said scale inhibitor composition into said subterranean formation via a well bore in fluid communication with said formation, absorbing said first and second homopolymers in a matrix of said formation, and desorbing said first and second homopolymers from said matrix over time into said aqueous fluid.

4. The method of claim 3 wherein the weight ratio of said first homopolymer to said second homopolymer in said scale inhibitor composition is between about 10:1 and about 1:1.

5. The method of claim 4 wherein the weight ratio of said first homopolymer to said second homopolymer is adjusted in response to the geology of said matrix and differences between the desorption rates of said first and second homopolymers from said matrix.

6. The method of claim 1 wherein the weight ratio of said first homopolymer to said second homopolymer in said scale inhibitor composition is between about 10:1 and about 1:1.

7. The method of claim 1 wherein the weight ratio of said first homopolymer to said second homopolymer in said scale inhibitor composition is between about 9:1 and about 3:2.

8. The method of claim 1 wherein said inorganic sulfate scale is barium sulfate.

9. The method of claim 1 wherein said first homopolymer has a molecular weight between about 7,000 and about 30,000.

10. The method of claim 1 wherein said second homopolymer has a molecular weight between about 2,000 and about 5,000.

11. The method of claim 1 wherein said aqueous fluid has a total active polymer concentration of at least about 30 ppm after contact with said scale inhibitor composition.

12. The method of claim 1 wherein said aqueous fluid has a total active polymer concentration of between about 40 ppm and about 100ppm after contact with said scale inhibitor composition.

13. The method of claim 1 wherein said aqueous fluid has a total active polymer concentration of between about 40 ppm and about 100 ppm after contact with said first and second homopolymers.

14. A method for inhibiting barium sulfate s-ale growth in an aqueous fluid present in or produced from a subterranean formation comprising:
contacting said aqueous fluid with a first homopolymer and a second homopolymer in solution within an aqueous medium, wherein said first homopolymer is a polyvinyl sulfonate and said second homopolymer is a polyacrylic acid and the weight ratio of said first homopolymer to said second homopolymer in said aqueous medium is between about 10:1 and about 1:1, and further wherein sufficient amounts of said first and second homopolymers contact said aqueous fluid to produce a total active polymer concentration of at least about 30 ppm in said aqueous fluid after contact with said first and second homopolymers.

15. The method of claim 14 wherein said first homopolymer has a molecular weight between about 7,000 and about 30,000.

16. The method of claim 14 wherein said second homopolymer has a molecular weight between about 2,000 and about 5,000.

* * * * *

UNITED STATES PATENT AND TRADEMARK OFFICE
CERTIFICATE OF CORRECTION

PATENT NO. : 5,263,541
DATED : November 23, 1993
INVENTOR(S) : Richard T. Barthorpe and Frank L. Dormish It is certified that error appears in the above-identified patent and that said Letters Patent is hereby corrected as shown below:

```
Col. 4, line  5:   Delete "sulfonate however," and insert therefor --sulfonate,
                   however,--.
Col. 4, line 11:   Delete "Services Ltd." and insert therefor --Services, Ltd.--.
Col. 4, line 11:   Delete ""SCALETREAT"" and insert therefor --"SCALETREAT--.
Col. 4, line 12:   After "205." insert --"--.
Col. 7, line 12:   Delete "%".
Col. 7, line 13:   Before "total" insert --%--.
Col. 7, line 45:   Delete "%".
Col. 7, line 46:   Before "total" insert --%--.
Col. 8, line  4:   Delete "%".
Col. 8, line  5:   Before "total" insert --%--.
```

Signed and Sealed this

Thirty-first Day of May, 1994

*Attest:*

BRUCE LEHMAN

*Attesting Officer*      Commissioner of Patents and Trademarks